United States Patent
Akhtar et al.

(10) Patent No.: US 6,819,652 B1
(45) Date of Patent: Nov. 16, 2004

(54) METHOD AND APPARATUS FOR PROCESSING CONTROL MESSAGES IN A COMMUNICATIONS SYSTEM

(75) Inventors: Haseeb Akhtar, Garland, TX (US); Lakshminarasimhan Aravamudhan, Plano, TX (US); Emad A. Qaddoura, Plano, TX (US); Raja P. Narayanan, Plano, TX (US); Akram Hosain, Simi Valley, CA (US)

(73) Assignee: Nortel Networks Limited, St. Laurent (CA)

(*) Notice: Subject to any disclaimer, the term of this patent is extended or adjusted under 35 U.S.C. 154(b) by 937 days.

(21) Appl. No.: 09/598,565

(22) Filed: Jun. 21, 2000

(51) Int. Cl.[7] .................................................. H04J 3/26
(52) U.S. Cl. ....................................... 370/230; 370/392
(58) Field of Search ................................. 370/229, 230, 370/231, 235, 392, 465, 474

(56) References Cited

U.S. PATENT DOCUMENTS

| | | | | | |
|---|---|---|---|---|---|
| 6,055,564 | A | * | 4/2000 | Phaal | 709/207 |
| 6,104,998 | A | * | 8/2000 | Galand et al. | 704/500 |
| 6,693,909 | B1 | * | 2/2004 | Mo et al. | 370/392 |
| 2001/0053149 | A1 | * | 12/2001 | Mo et al. | 370/389 |

OTHER PUBLICATIONS

Calhoun, Pat R. et al, "Diameter Framework Document." Internet Draft, Apr., 2000, pp. 1–33.

Vollbrecht, J. et al, "AAA Authorization Framework." Internet Draft, Oct., 1999, pp. 1–33.

Calhoun, Pat R. et al, "Diameter Mobile IP Extensions." Internet Draft, Mar., 2000, pp. 1–21.

Calhoun, Pat R. et al, <<Diameter Base Protocol.>>Internet Draft, Apr., 2000, pp. 1–44.

De Laat, C. et al, "Generic AAA Architecture." Internet Draft, Mar., 2000, pp. 1–24.

Nichols, K. et al. Definition of the Differentiated Services Field (DS Field) in the IPv4 and IPv6 Headers. Request for Comments, Dec., 1998, pp. 1–17.

Perkins, C., "IP Mobility Support." Request for Comments, Oct., 1996, pp. 1–74.

* cited by examiner

*Primary Examiner*—Melvin Marcelo

(57) ABSTRACT

A method and apparatus in a communications system for processing control messages for a session in a packet-based network within the communications system. A first indicator is set in a control message for handling a session within the communications system through the packet-based network. The control message is sent to a destination within the packet-based network. The control message is provided priority processing within the packet-based network based on the presence of the first indicator. A second indicator is set in a header of a packet used to transport the control message, such that nodes within the packet based network, which do not examine the control message, provide priority processing of the packet in sending the packet through the packet-based network to the destination.

26 Claims, 3 Drawing Sheets

METHOD AND APPARATUS FOR PROCESSING CONTROL MESSAGES IN A COMMUNICATIONS SYSTEM

FIELD OF THE INVENTION

The present invention relates to an improved communications system and in particular to a method and apparatus for processing control messages in a communication system. Still more particularly, the present invention provides a method and apparatus for processing control messages through a packet-based portion of a communications system.

BACKGROUND OF THE INVENTION

Voice communications over packet-based networks are becoming more common within communications systems. Currently, many of these networks are Internet Protocol (IP) networks. These voice communications are referred to as voice over IP or VoIP. The use of these networks for communications takes advantage of resources already in place. Further, companies with Internet systems also may implement voice over IP communications using their existing network systems. Further, in addition to voice, the presence of a packet-based network allows for various services to be offered based on the packet-based technologies, such as, for example, providing e-mail messages and documents across the same terminal device.

One problem with a packet-based network system used for voice is the fact that IP networks, such as the Internet, consists of multiple routers, which are linked together. These routers store the data packets and forward them to the most appropriate output links, which may range from 64 kilobits per second over a twisted pair to 155 megabits per second or greater over fiber based links.

IP is a datagram-based approach and offers no guarantee of quality. For example, network delay may be variable depending on the traffic within the network. In an IP network, packets are self-steering and dependant on the IP address. As a result, packets may take different routes depending on how busy each router is within a network. In contrast, with a fixed circuit, the delay is fixed and known. A further problem with IP networks is that depending on the traffic within a network, packets may be dropped. For transmission of data, packets may be resent. As a result, the packets retransmitted are delayed more than other packets taking the same route, which are not dropped. This retransmission mechanism is appropriate for applications, which are insensitive to delays. These mechanisms are commonly used in applications, such as, for example, Web browsers and e-mail programs.

On the other hand, with delay sensitive applications, variable delays and dropping of packets are undesirable. When the delay sensitive application includes transmitting voice data, variable delay or dropping of packets is unacceptable to maintain an appropriate quality of service for a call. Another instance in which the unpredictable delay or dropping of packets is unacceptable occurs as with control messages used to set up, manage, and terminate a session for a call. Currently, no mechanism is present for handling control messages over a packet-based network to guarantee delivery of these messages.

Therefore, it would be advantageous to have an improved method and apparatus for handling control messages in an IP communications system.

SUMMARY OF THE INVENTION

An improved method and apparatus for handling control messages is provided in which priority or preferential processing of these control messages occurs within a packet-based portion of a communications system. More specifically, the present invention provides a method in a communications system for processing control messages for a session in a packet-based network within the communications system. A priority indicator is placed in a control message handling a session within the communications system through the packet-based network. Applications handling control messages in the packet-based network will provide priority or preferential handling of the control message containing the priority indicator.

In the depicted examples, some nodes contain applications, which handle control messages, while other nodes only handle packets transporting the control messages and do not process the control messages themselves. In this case, another indicator also may be placed in the header of a packet transporting the control message. This indicator is used by nodes, which handle the packets to provide priority processing of the packets in these nodes. In this manner, the control message may be given priority handling even in nodes in which an application handling control messages is absent. Thus, priority handling of the control message is provided within the packet-based network within the communications system.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
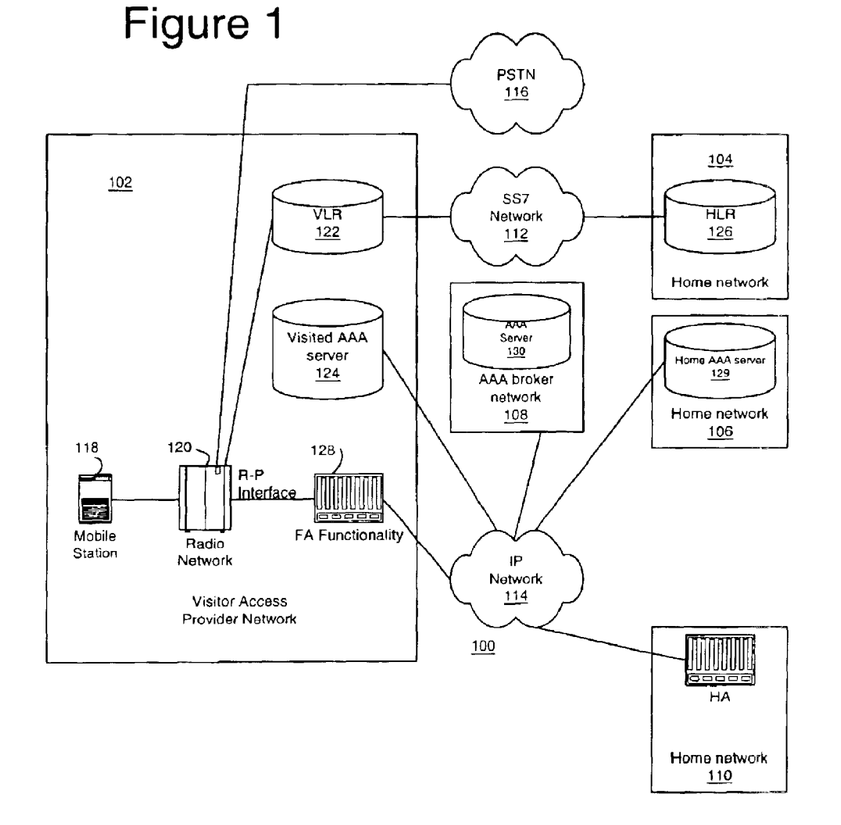
FIG. 1 is a diagram of a communications system in accordance with the preferred embodiment of the present invention.

With reference now to the figures and in particular with reference to FIG. 1, a communications system is illustrated in accordance with a preferred embodiment of the present invention. In this example, communications system 100 includes a visitor access provider network 102, home access provider network 104, home Internet Protocol (IP) network 106, authentication, authorization, and accounting (AAA) broker network 108, home access provider network 110, SS7 network 112, IP network 114, and public switched telephone network (PSTN) 116.

AAA broker network 108 includes AAA services. These AAA services consist of authentication, authorization, and accounting services. The authentication services are used to verify the identity of an entity. Authorization is a service used to determine whether the requesting entity is allowed access to a resource. Accounting services collect information on resource usage for purposes, such as trend analysis, auditing, billing, or cost allocation.

SS7 network 112 is a signaling system number 7 network used for switching data messages used for connecting calls and maintaining the signaling network itself. SS7 network 112 is designed for use with voice networks, such as PSTN 116. IP network 114 and PSTN network 116 are both used for carrying voice calls from visitor access provider network 102 to some destination in this example. The destination may be somewhere within PSTN 116 or to HA 110.

In FIG. 1, visitor access provider network 102 includes a mobile station 118, a radio network 120, a visitor location register (VLR) 122, a visited AAA server 124, and a foreign agent (FA) functionality 128, which is hosted on a device or platform. In this example, radio network 120 may take various forms, such as, for example, time division multiple access (TDMA) or code division multiple access (CDMA) cellular system. Of course, radio network 120 may be implemented using any type of radio system. A call may be initiated or terminated at mobile station 118 through radio network 120. The route of a call may pass through PSTN 116 or IP network 114. If the call is to be placed in packet form, FA functionality 128 handles the transmission of these packets. FA Functionality provides routing services to mobile station 118. Often times, this functionality is embodied in a router on the visited network of mobile station 118. More information on FA functionality may be found in RFC 2002, entitled *IP Mobility Support*, which is available from the Internet Engineering Task Force (IETF). The setting up, terminating, and management of the call may be handled through SS7 network 112, VLR 122, and home location register (HLR) 126. This setting up, terminating, and management is also just referred to as managing or handling. VLR 122 is used to store subscriber information for a subscriber in a particular service area, such as within visitor access provider network 102. This information may be obtained from HLR 126, which is a functional unit used for managing mobile subscribers through maintaining all subscriber information. Thus, when a subscriber using a mobile station, such as mobile unit 118, travels from one service area to another, the information from HLR 126 may be sent to the VLR for that particular service area. All of the signaling and control messages i, are handled through SS7 network 112, while the voice data for the call is handled through PSTN 116.

With packet-based calls, such as voice over IP, the messaging and the voice data are both passed through IP network 114. In this case, visited AAA server 124 and FA functionality 128 provide a similar function to VLR 122 within visitor access provider network 102. In this case, the control messages, such as a registration request generated by mobile station 118, will be forwarded to FA functionality 128. FA functionality 128 will then send these messages to HA 110 through IP network 114. FA functionality 128 may also send the AAA messages to visited AAA server 124 and which in turn forwards them to home AAA server 129 via IP network 114. In this example, FA functionality 128 is also referred to as the home AAA server. Home AAA server 129 within home IP network 106, AAA server 130 within AAA broker network 108, and visited AAA server 124 provide functions similar to FA functionality 128, VLR 122, and HLR 126.

A mechanism for handling control messaging through IP network 114 is used in accordance with the preferred embodiment of the present invention. This mechanism provides a priority or precedence mechanism for the handling of control messages by various nodes within IP network 114. This mechanism is used for all control messaging related to a session for a call. A session is the active connection between two nodes used in a call. These messages are for different functions, such as, for example, those used for IP mobility including handoffs, registrations, and AAA functions. IP mobility allows for a mobile station, such as mobile station 118 to travel from network to network in different service areas and still have an uninterrupted connectivity. For example, mobile station 118 has a home network, home access provider network 110, and is currently located in visitor access provider network 102. The control messaging used for registering mobile station 118 within visitor access provider network 102 and for handling calls initiated from and terminated to mobile station 118 is provided priority or precedence over other types of messages transported through IP network 114. The priority is assigned to this kind of messaging because control messages are handled by delay sensitive applications. Radius and diameter are examples of applications containing control messaging functions. AAA broker network 108, in this example, provides address resolution service to the visited networks that do not have a service level agreement with a particular home network. AAA broker network 108 also may provide security parameters for establishing sessions between visited and home networks. These applications include, for example, those found in home AAA 129, AAA server 130 and visitor AAA 124.

Communications system 100 is an exemplary communications system in which the present invention may be implemented. The illustration is not meant to imply architectural limitation to the present invention. Other types of inventions may be used in place of those illustrated.

Figure 2:
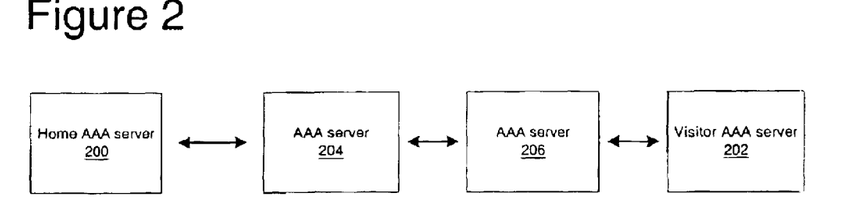
FIG. 2 is a blocked diagram illustrating control message flow in accordance with a preferred embodiment of the present invention.

Turning next to FIG. 2, a blocked diagram illustrating control message flow is depicted in accordance with a preferred embodiment of the present invention. In this example, control messages are generated by home AAA server 200 for receipt and use by visited AAA server 202. Home AAA server 200 may be, for example, home AAA server 129 in FIG. 1 while visited AAA server 202 may be visited AAA server 124 in FIG. 1. Home AAA server 200 may be providing control messages relating to authentication, authorization, or accounting to visitor server 202. In this case, these control messages are for the delay sensitive applications, such as voice/video streaming. A priority indicator is placed into each of the control messages sent from home AAA 200 to visited AAA server 202. These control messages are routed through a path including AAA server 204 and AAA server 206. The applications (i.e., radius and diameter) in these servers will route the control messages to visitor server AAA 202. In routing the control messages, the messages are examined to see whether an indicator has been sent within the control message. If the priority indicator is set in the control message, the message is handled accordingly. The indicator in a message may contain different levels of priority, such as, for example, 1, 2, 3, and 4 with 1 having the highest priority. Alternatively, other types of indicators may be used, such as platinum, gold, silver, and bronze with platinum having the highest priority. Control messages having higher priority indicators will be processed or routed prior to control messages having lower level indicators or no indicators at all.

In the depicted example, messages are placed in a queue for processing. Typically, messages are processed in a first-in-first-out (FIFO) basis. When priority indicators are used, exceptions to FIFO processing are made. Messages having a priority indicator are placed ahead of messages without a priority indicator in the queue. With multiple or different levels of priority, messages having higher priority levels are placed ahead of messages with lower priority levels in the queue.

Figure 3:
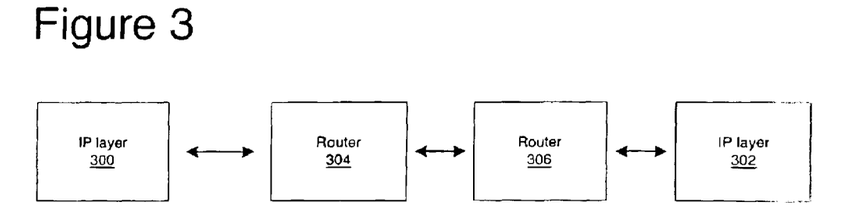
FIG. 3 is a diagram of control message flow through packet-based routers in accordance with a preferred embodiment of the present invention.

Turning next to FIG. 3, a diagram of control message flow through packet-based routers is depicted in accordance with a preferred embodiment of the present invention. In some cases, control messages may be routed through nodes, which do not contain applications to control the flow of control messages. For example, within an IP network, such as IP network 114 in FIG. 1, messages may be placed into IP packets for routing from a source to a destination through a number of different nodes, such as routers. These routers do not examine the control messages themselves, but route the data based on the headers in the IP packets. In this example, IP layer 300 generates IP packets containing data for control messages and sends them to IP layer 302. These IP layers may be located in a home AAA server and a visited AAA server, such as home AAA server 129 in FIG. 1 and visited AAA server 124 in FIG. 1.

In this case, the path between these servers passes through router 304 and router 306. These routers do not examine the control messages, but process the IP packets based on the information in the headers of the IP packets. In such as case, IP layer 300 is instructed through a call or some other mechanism to set an indicator to provide priority handling of the IP packets. When an IP packet is received by router 304 or router 306, the header of the IP packet is examined. In addition to identifying where to send the IP packet, a determination is made as to whether an indicator is set in the header of the IP packet to identify whether the IP packet is to be given priority in processing. If an indicator is set in the header, then that IP packet is processed prior to other IP packets without the indicator.

For example, an IP packet containing the indicator will be placed in a processing queue prior to other packets without an indicator. In this manner, priority handling of packets containing control messages may be obtained even in nodes, which do not contain applications that examine the control messages themselves.

Figure 4:
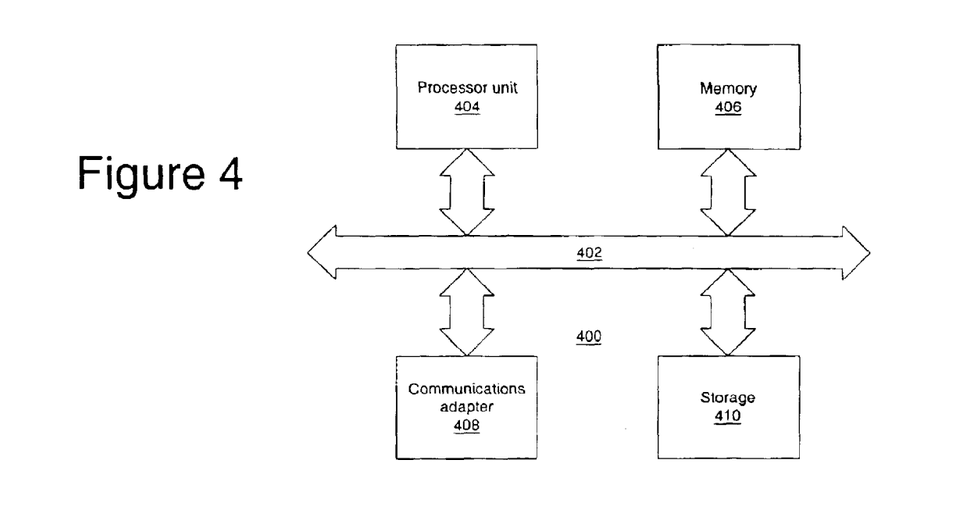
FIG. 4 is a block diagram of a node in which the present invention may be implemented in accordance with a preferred embodiment of the present invention.

Turning next to FIG. 4, a block diagram of a node in which the present invention may be implemented is depicted in accordance with a preferred embodiment of the present invention. In this example, node 400 contains a bus 402 providing communication between processor unit 404, memory 406, communications adapter 408, and storage 410. Processor unit 404, in this example, executes instructions, which may be located in memory 406 or storage 410. Communications adapter 408 is used to send and received data, such as control messages. Node 400 may be used to implement different components of the present invention. For example, node 400 may be a router used to route IP packets, an AAA server, or any other server or communications unit used to route or handle control messages within a packet-based network, such as IP network 114 in FIG. 1.

The illustrated example in FIG. 4 is not meant to apply architectural limitation to the present invention. For example, although bus 402 is the depicted mechanism for providing communications between the components within node 400, any other sort of interconnect or communications mechanism may be used to provide communications between the different components within node 400.

Figure 5:
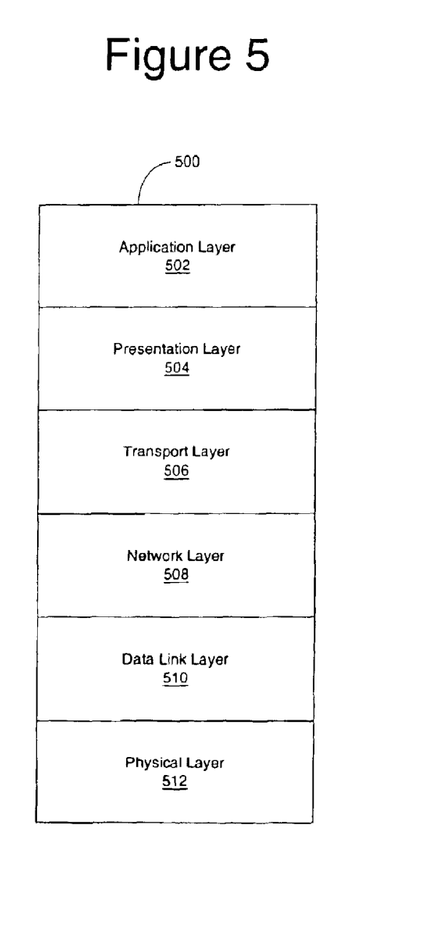
FIG. 5 is a diagram of a protocol stack in accordance with preferred embodiment of the present invention.

Turning now to FIG. 5, a diagram of a protocol stack is depicted in accordance with preferred embodiment of the present invention. In this example, protocol stack 500 includes an application layer 502, a presentation layer 504, a transport layer 506, a network layer 508, a data link layer 510, and a physical layer 512. In the depicted example, protocol stack 500 is located in a node with an application that handles control messages.

These layers follow the Open System Interconnection (OSI) standard defining a framework implementing protocols in seven layers. Control is passed from one layer to the next, starting at the application layer in one station or device, proceeding to the bottom layer, moving over a communications channel to the next station or device, and proceeding back up the hierarchy. Protocol stack 500 may be found in a node, such as visited AAA server 124, HA 110, or FA functionality 128 in FIG. 1.

The mechanism of the present invention is implemented in application layer 502 and network layer 508 in these examples. An application program in application layer 502 may generate or receive control messages. When generating a control message, the application includes an indicator to provide priority processing by an application receiving the control message. Further, the application in the node generating the message may send a call or command to network layer 508 to provide for priority or precedence handling of IP packets containing the control message. In this example, network layer 508 includes an IP protocol. In response to receiving a request to provide priority or precedence handling for a control message being transported using one or more IP packets, the headers of these IP packets will include an indicator used by other network layers located in nodes routing IP packets to provide priority or precedence in the processing of these IP packets.

In this manner, when control messages are routed by nodes that do not examine the control messages in routing the messages, priority in the handling of these messages is insured. In this manner, delays in the handling of control messages are reduced.

Figure 6:
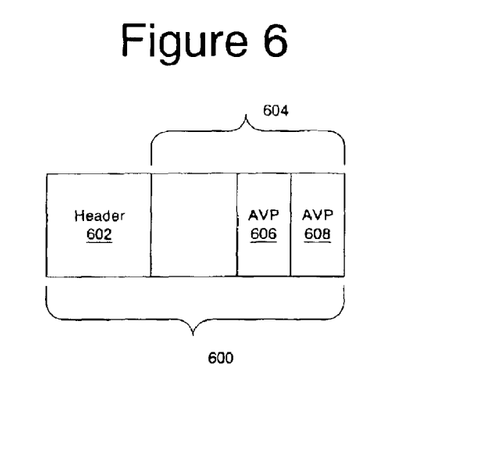
FIG. 6 is a diagram control message depicted in accordance with a preferred embodiment of the present invention.

Turning next to FIG. 6, a diagram of a control message is depicted in accordance with a preferred embodiment of the present invention. Control message 600 is an example of a control message generated by an application to handle a session for a call. These messages may be, for example, a message to set up a session, a message to terminate a session, and a message to authenticate/authorize a user. Examples of other control messages include, for example, accounting record messages and mobility management messages. Control message 600 includes a header 602 and a payload 604 in which attribute-value pairs (AVPs) are located. In this example, AVP 606 and AVP 608 are located within payload 604 of control message 600. An AVP, in these examples, consists of three parts: an identifier, a length, and data. A unique AVP identifier is assigned to all data objects in order to be able to distinguish the data contained. In this example, AVP 606 is a priority AVP used to provide priority or precedence for control message 600 in accordance with a preferred embodiment of the present invention. The present invention provides a new AVP identifier to indicate that the AVP is a priority AVP. Other AVPs that may be found within control message 600 include, for example, an IP address, an encryption code, an e-mail address, authentication parameters, and a user ID. With AVP 606, applications processing the control messages will provide the appropriate priority for precedence for the message based on AVP 606. In these examples, control messages, such as control message 600, a placed into a queue for processing by an application. When AVP 606 is present, the control message is placed ahead of other control messages in the queue for processing. If multiple levels of priority are present, the placement of the control message will be based on the priority in AVP 606 as compared to the priority of other messages in the queue.

A number of different types of AVPs, other than a priority AVP, may be located within payload 604. In the depicted examples, these AVPs and the servers processing the AVPs follow the Diameter protocol. More information on the Diameter protocol may be found in draft-calhoun-diameter-framework-07.txt and draft-calhoun-diameter-14.txt from the IETF.

Figure 7:
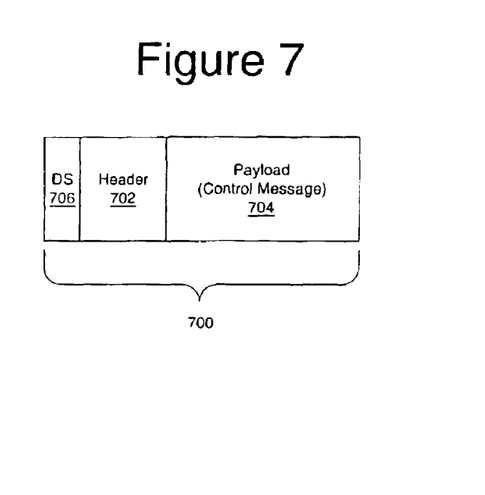
FIG. 7 is a diagram of an IP packet in accordance with a preferred embodiment of the present invention.

With reference next to FIG. 7, a diagram of an IP packet is depicted in accordance with a preferred embodiment of the present invention. In this example, IP packet 700 is an example of an IP packet sent onto an IP network, such as IP network 114 in FIG. 1. In this example, IP packet 700 includes a header 702 and a payload 704. Payload 704, in this example, contains an entire control message, such as control message 600 in FIG. 6. Depending on the size of the control message, the control message may be placed into multiple IP packets for transmission on the IP network.

To provide for priority handling of the control message contained within IP packet 700 by nodes in which an application processing control messages is absent, an indicator is set within header 702 of IP packet 700. In the depicted examples, a differential services (DS) field 706 is set to provide priority or precedence for the handling of IP packet 700 by nodes, which do not examine the control message in the processing of IP packet 700. In accordance with a preferred embodiment of the present invention, this field is set by a network layer, such as network layer 508 in FIG. 5, in response to a call from an application in an application layer within the protocol stack. In particular, DS field 706 is set to provide for priority or precedence handling of control messages placed into IP packets routed by nodes, such as routers, which do not examine the control message itself when routing the IP packets. When DS field 706 is set, a node receiving IP packet 700 will provide priority handling for the packet. In the depicted examples, packets, such as IP packet 700, are typically placed into a queue for processing or routing to another node. The packets are processed using a FIFO process. IP packet 700 is placed in the queue ahead of other packets in which a DS field is not set.

Figure 8:
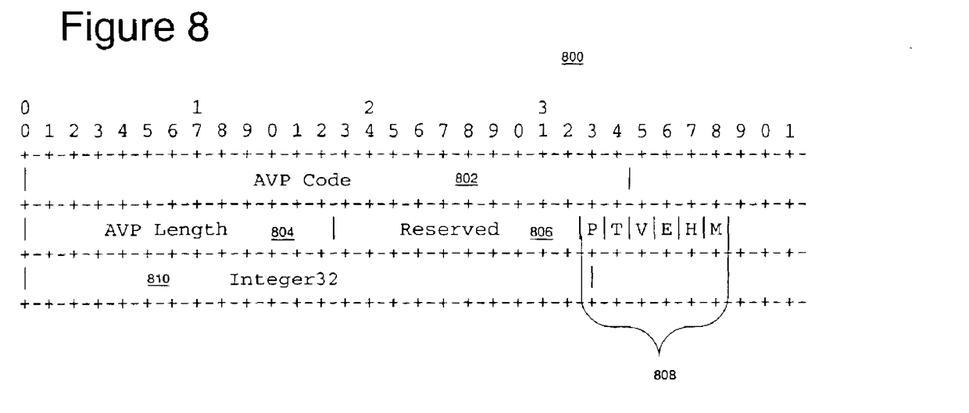
FIG. 8 is an example of a priority AVP format in accordance with a preferred embodiment of the present invention.

Turning now to FIG. 8, an example of a priority AVP format is depicted in accordance with a preferred embodiment of the present invention. AVP 800 is an example of an AVP format used for a priority AVP. In this example, AVP 800 includes AVP code field 802, which identifies the particular attribute. AVP code field 802 contains the appropriate code to identify AVP 800 as a priority AVP.

AVP length field 804 in this example is two octets and indicates the length of AVP 800. In other words, AVP length 804 is used to identify when AVP 800 ends and another AVP begins. Reserved field 806 is reserved for other uses.

Flags field 808 contains flags as described in the diameter based protocol. In this example, H and E may be set depending on the security model used, while M, V, T, and P are not set. Integer 32 field 810 contains the priority number of the issuing device. In particular, a number of different codes may be used in integer 32 field 810 to provide priority or precedence handling of the control message itself. For example, platinum, gold, silver, and bronze levels may be implemented. In such a case, platinum receives the highest priority while bronze receives the lowest priority. In the depicted examples, a single AVP code is used for all priorities, with the level of the priority being placed within the data section of the AVP.

Figures 9, 10:
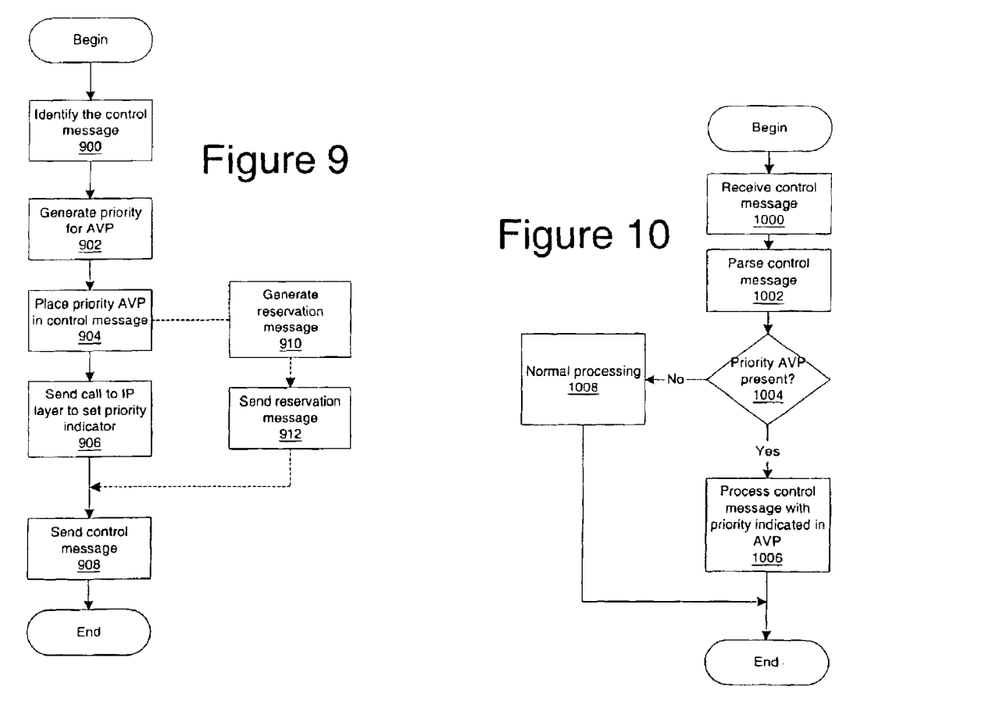
FIG. 9 is a flowchart of a process for generating a control message in accordance with a preferred embodiment of the present invention.
FIG. 10 is a flowchart of a process used to process control messages in accordance with a preferred embodiment of the present invention.

Turning now to FIG. 9, a flowchart of a process for generating a control message is depicted in accordance with a preferred embodiment of the present invention. The process illustrated in FIG. 9 may be implemented in an application layer, such as application layer 502 in FIG. 5, for use in a server, such as visited AAA server 124 or home AAA server 129 in FIG. 1.

The process begins by identifying time sensitive data in the message (step 900). In this case, the control message itself is the time sensitive data. In response to identifying time sensitive data, a priority AVP is generated (step 902).

This priority AVP may be an AVP, such as AVP 800 in FIG. 8. Next, the priority AVP is placed in the control message (step 904). This priority AVP is the priority indicator for the control message in this example. This priority AVP is a priority AVP, such as AVP 606 in FIG. 6.

Additionally, a call is sent to an IP layer in the protocol to set the priority indicator (step 906). In the depicted example, this call is made to a network layer, such as network layer 508 in FIG. 5. The priority indicator set in response to this call is a priority indicator in a header of the packet used to transport the control message. In the depicted examples, this priority indicator is a DS field, such as DS field 706 in FIG. 7. This call is used to provide priority handling of packets used to transport control messages. The setting of this indicator allows for priority handling of the packet in nodes, which do not examine control messages. In this manner, best efforts handling in the transport of the control message from a source to a destination is ensured even when the message is being transported through nodes, which do not look at the contents of the packets themselves. The control message is then sent for transport (step 908) with the process terminating thereafter. This step involves sending the control message to the next layer in the protocol stack, such as a transport layer.

Of course, the application also may make additional calls or send additional messages to ensure that the control message reaches the target with minimal delay. For example, steps 910 and 912 are optional steps, which may be implemented in a system using resource reservation protocol (RSVP). If RSVP is used, the process in FIG. 9 also generates a reservation message (step 910) and sends the reservation message (step 912).

RSVP is a network-controlled protocol that enables Internet applications to obtain special qualities of service for data flow. Data flow occurs between two points, such as a source or sending host and a target or receiving host. RSVP works in conjunction with routing protocols and installs the equivalent of dynamic access list along the routes that routing protocols calculate or establish. RSVP data flows are generally characterized by sessions over which data-packets flow. A session is a set of data flows with the same uni-task or multi-task destination in these examples. A path message is a RSVP message sent by a sender or source forwarded along a uni-task or multi-task route provided by routing protocols located in various nodes. The path message is used to store the path state in each node. The path data is used to route reservation messages in the reverse direction. With RSVP, bandwidth may be reserved in nodes, such as routers, for selected data flows to ensure that the data flow occurs without delay. RSVP typically is implemented in a transport layer, such as transport layer 506 in FIG. 5. More information on RSVP may be found in RFC 2205, which is available from the IETF.

The setting of an indicator in the header of an IP packet and the use of a mechanism to reserve bandwidth for processing selected packets are intended as examples of mechanisms used to provide best efforts processing of control messages. These examples are not intended as limitations as to the types of mechanisms that may be used to ensure that control messages are processed as quickly as possible at nodes, including nodes routing packets containing control messages in which the control messages themselves are not examined.

Turning now to FIG. 10, flowchart of a process used to process control messages is depicted in accordance with a preferred embodiment of the present invention. The process in FIG. 10 may be implemented in an application layer, such as application layer 502 in FIG. 5. These processes may be used in a server, such as visited AAA server 124 or home AAA server 129 in FIG. 1.

The process begins by receiving a control message (step 1000). This control message is received after IP packets have received by a lower layer in the protocol and placed into a form for use by the application. The control message is parsed (step 1002). A determination is made as whether a priority AVP is present within the control message (step 1004). If a priority AVP is present, then the control message is processed based on a priority indicated in the AVP (step 1006) with the process termination thereafter. If a priority AVP is absent in the control message, then the control message is processed normally (step 1008) with the process terminating thereafter.

Priority in processing may be achieved by placing the control message or the data from the control message higher up in a queue or buffer for processing with respect to other control messages in which priority is absent or in which priority is lower than that of the current control message.

A similar process is followed by router processing IP packets. Upon receiving an IP packet, the router examines the header to see whether an indicator is present or set for priority handling of the IP packet.

Thus, the present invention provides a priority based mechanism used to control messaging within a packet-based network, such as an IP network. In these examples, control messages are an example of messages containing time sensitive information that is sensitive to delays in delivery. The mechanism of the present invention allows for these types of control messages to be appropriately handled when received by different nodes, such as a router, a device/platform hosting FA functionality, an AAA broker, or an AAA server. The priority handling is provided through the setting of various indicators within the messages and packets by the application layer. In this manner, the processing of messages and IP networks may be handled more quickly to avoid delays in delivering data to delay sensitive applications.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media, such as digital and analog communications links.

The description of the present invention has been presented for purposes of illustration and description and is not intended to be exhaustive or limited to the invention in the form disclosed. Many modifications and variations will be apparent to those of ordinary skill in the art. For example, although the depicted examples use control messages, the processes of the present invention may be implemented for other types of data and messages other than control messages. Further, the processes may be applied using other protocols other than those illustrated herein. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a communications system for processing control messages in a packet-based portion of the communications system, the method comprising:

placing a priority indicator in a control message to indicate to an application handling the control messages that the control message is to be given priority in processing; and placing a priority indicator in a header of a packet transporting the control message within the packet-based portion of the communications system to indicate to a node receiving the packet that the packet is to be given priority in processing.

2. The method of claim 1, wherein the packet is an Internet Protocol packet.

3. The method of claim 1, wherein the node is one of a server, a router, and a device/host platform hosting foreign agent functionality.

4. The method of claim 1 further comprising:

sending a request to the node to reserve processing resources to process the packet.

5. A method in a communications system for processing control messages for a session in a packet-based network within the communications system, the method comprising:

setting an indicator for a control message handling the session within the communications system through the packet-based network; and sending the control message to the packet-based network, wherein the packet-based network provides preferential processing of the control message in managing the session based on the indicator.

6. The method of claim 5, wherein the indicator is an attribute value pair located in the control message.

7. The method of claim 5, wherein the control message is transported through a plurality of nodes and further comprising setting a second indicator, wherein the plurality of nodes provide preferential handling of the control message based on the second indicator.

8. The method of claim 7, wherein the second indicator is a differential service bit in an Internet Protocol header in a packet transporting the control message.

9. The method of claim 5, wherein a set of nodes is configured to reserve bandwidth for processing selected messages and further comprising:

sending a message to the set of nodes to reserve the bandwidth for processing the control message.

10. The method of claim 5, wherein the set of nodes include at least one of a router, a server, and a device/host platform hosting foreign agent functionality.

11. The method of claim 5, wherein the control message is a message from a set of messages to establish the session, terminate the session, and manage the session.

12. A node comprising:

a bus;

a communications adapter connected to the bus, wherein the communications adapter sends and receives messages to and from a packet-based network;

a memory connected to the bus, wherein the memory includes instructions for an application; and a processing unit connected to the bus, wherein the processing unit executes a set of instructions to generate a control message for a session within an application at a remote node, place a priority indicator in the control message to indicate to an application handling the control messages that the control message is to be given priority in processing, and place a priority indicator in a header of a packet transporting the control message within the packet-based portion of the communications system to indicate to a node receiving the packet that the packet is to be given priority in processing.

13. A communications system for processing control messages in a packet-based portion of the communications system, the communications system comprising:

first placing means for placing a priority indicator in a control message to indicate to an application handling the control messages that the control message is to be given priority in processing; and second placing means for placing a priority indicator in a header of a packet transporting the control message within the packet-based portion of the communications system to indicate to a node receiving the packet that the packet is to be given priority in processing.

14. The communications system of claim 13, wherein the packet is an Internet Protocol packet.

15. The communications system of claim 13, wherein the node is one of a server, a router, and a device/host platform hosting foreign agent functionality.

16. The communications system of claim 13, further comprising:

sending means for sending a request to the node to reserve processing resources to process the packet.

17. A communications system for processing control messages for a session in a packet-based network within the communications system, the communications system comprising:

setting means for setting an indicator for a control message handling the session within the communications system through the packet-based network; and sending means for sending the control message to the packet-based network, wherein the packet-based network provides preferential processing of the control message in managing the session based on the indicator.

18. The communications system of claim 17, wherein the indicator is an attribute value pair located in the control message.

19. The method of claim 17, wherein the control message is transported through a plurality of nodes and further comprising a second setting means for setting a second indicator, wherein the plurality of nodes provide preferential handling of the control message based on the second indicator.

20. The method of claim 19, wherein the second indicator is a differential service bit in an Internet Protocol header in a packet transporting the control message.

21. The communications system of claim 17, wherein a set of nodes is configured to reserve bandwidth for processing selected messages and further comprising:

sending means for sending a message to the set of nodes to reserve the bandwidth for processing the control message.

22. The communications system of claim 17, wherein the set of nodes include at least one of a router, a server, and a device/host platform hosting foreign agent functionality.

23. The communications system of claim 17, wherein the control message is a message from a set of messages to establish the session, terminate the session, and manage the session.

24. A computer program product in a computer readable medium for processing control messages in a packet-based portion of the communications system, the computer program product comprising:

first instructions for placing a priority indicator in a control message to indicate to an application handling the control messages that the control message is to be given priority in processing; and second instructions for placing a priority indicator in a header of a packet transporting the control message within the packet-based portion of the communications system to indicate to a node receiving the packet that the packet is to be given priority in processing.

25. A computer program product in a computer readable medium for processing control messages for a session in a packet-based network within a communications system, the computer program product comprising:

first instructions for setting an indicator in a control message handling a session within the communications system through the packet-based network; and second instructions for sending the control message to the packet-based network, wherein the packet-based network provides preferential processing of the control message in managing the session based on the indicator.

26. The computer program product of claim 25, wherein a set of nodes is configured to reserve bandwidth for processing selected messages and further comprising:

third instructions for sending a message to the set of nodes to reserve the bandwidth for processing the control message.

* * * * *

UNITED STATES PATENT AND TRADEMARK OFFICE
CERTIFICATE OF CORRECTION

PATENT NO.     : 6,819,652 B1
DATED          : November 16, 2004
INVENTOR(S)    : Akhtar et al.

It is certified that error appears in the above-identified patent and that said Letters Patent is hereby corrected as shown below:

Column 12,
Line 7, after "19. The" delete "method" and insert -- communication system --.
Line 13, after "20. The", delete "method" and insert -- communication system --.

Signed and Sealed this

Thirteenth Day of December, 2005

JON W. DUDAS
*Director of the United States Patent and Trademark Office*